(No Model.)
J. F. MORELL.
ANTI-FRICTION BEARING FOR VEHICLE WHEELS.
No. 445,377. Patented Jan. 27, 1891.
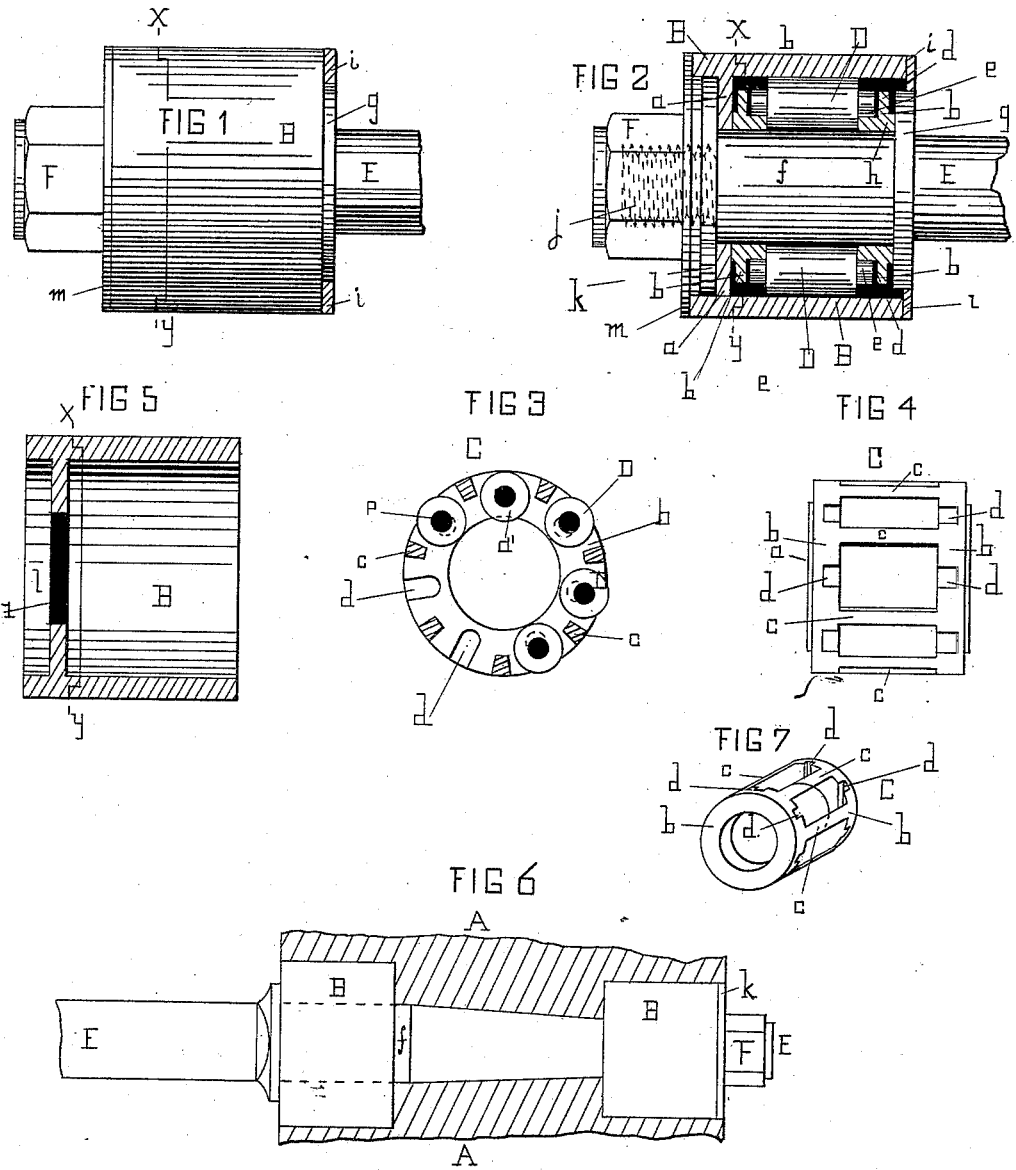
WITNESSES
INVENTOR
James F. Morell
by Francis D. Pastorius
Solicitor.

UNITED STATES PATENT OFFICE.

JAMES F. MORELL, OF CAMDEN, NEW JERSEY.

ANTI-FRICTION BEARING FOR VEHICLE-WHEELS.

SPECIFICATION forming part of Letters Patent No. 445,377, dated January 27, 1891.

Application filed September 29, 1890. Serial No. 366,432. (No model.)

*To all whom it may concern:*

Be it known that I, JAMES F. MORELL, a citizen of the United States, residing at Camden, in the county of Camden and State of New Jersey, have invented new and useful Improvements in Anti-Friction Boxes for Vehicle-Wheels and other Purposes, of which the following is a specification.

My invention consists in fixing in the bore of a wheel-hub a cylindrical box containing a roller-journal and spacing-cage provided with anti-friction rollers separated by their journals being in bearings of the annular rims which compose the ends of the cage, the said annular rims being joined together by longitudinal bars properly spaced apart for the passage of the rollers. The journal of the wagon-axle passes through the annular openings of the rims, the anti-friction rollers bearing between it and the cylindrical box. The wheel and its box revolve about the rollers, which turn on the axle-journal and reduce the friction to the lowest possible minimum.

On reference to the accompanying sheet of drawings, making part of this specification, Figure 1 is a longitudinal surface view of my anti-friction roller-bearing. Fig. 2 is a longitudinal and diametrical section of Fig. 1. Fig. 3 is an end view of the roller-spacing cage, the adjacent annular ring being removed to show the ends of the anti-friction rollers, their journals, the ends of the connecting-bars, and the journal-bearings, for which purposes some of the rollers are omitted, and one shown as dropped after the journal is removed. Fig. 4 is a longitudinal surface view of the roller-spacing cage without the rollers. Fig. 5 is a longitudinal and diametrical section of the hub-box in which the cage is contained. Fig. 6 is a longitudinal view of an axle with the anti-friction boxes in place, the wheel-hub being sectioned; and Fig. 7 is an isometrical view of the roller-spacing cage without the rollers.

Similar letters refer to similar parts in the several views.

A is the hub of a vehicle-wheel, and B a box driven firmly into its bore at front or back, or both.

C is a roller-spacing cage, which is inserted in the box B until its end bears against a diametrical partition $a$ of it. The said cage is composed of an annular rim $b$ at both ends with longitudinal strips $c$ for connecting them. At suitable distances apart are journal-bearings $d$, formed radially with open top ends in the opposing faces of the rims $b$. Into the bearings $d$ take the journals $e$ of the anti-friction rollers D, by which they are conveniently spaced apart. The depth of each journal-bearing $d$ is such that the rollers drop out of contact with the box B that the cage may be withdrawn from the box without difficulty, when the axle-journal is removed, and when it is returned they are forced outwardly by it and bear between it and the box B.

E is the axle, and $f$ its journal, of the usual pattern, to which one or more anti-friction boxes B can be applied, according to its size. On motion being imparted to the hub A the adherence of the box $b$ to the anti-friction rollers D causes them to revolve upon their journals $e$ in the journal-bearings $d$ of the spacing-cage C and turn about the journal $f$ with a minimum of friction.

For carrying my invention into practice and preventing the admission of dust and dirt to the rollers D, the axle E, Fig. 2, can be provided with a collar $g$, which bears against that end $h$ of the cage C. This collar can be encircled by a dust-ring $i$. (Shown in section.) That part or screw end $j$ of the axle E can have a washer $k$ about it, which takes into the recessed end $l$, Figs. 2 and 5, of the box B against the diaphragm $a$. The nut F can have a base $m$ fitting into or against the box, so that when it is screwed in place the device will be perfectly tight. For facility in getting at or removing the cage C, the box B can be divided circumferentially, as shown by the line $x\ y$, Figs. 1, 2, and 5.

I claim as my invention—

1. In an anti-friction bearing, the combination, with a box, of the roller-cage C, comprising the annular end pieces $b$, and the longitudinal strips $c$, connecting said end pieces and arranged at suitable distances around the same, said end pieces being provided in their opposing faces with the bearings $d$, which are closed at the outer side and inner end and open at the outer end and inner side, and the rollers having the journals fitted in said bearings, for the purpose set forth.

2. In an anti-friction bearing, the box B, provided with the internal diametric partition $a$ near one end thereof and divided circumferentially on a line close to and within said partition, in combination with a cage housed within the larger portion of said box, the rollers journaled within said cage, and disks bearing against the ends of the box for holding the parts of the box together, whereby the box can be separated to permit access to the cage and the removal of the rollers therefrom without detaching the box from the shaft or axle, for the purpose set forth.

3. In an anti-friction bearing, the combination of the box B, having the internal diametric partition $a$ near one end thereof, the roller-cage housed within the box and bearing against the inner face of said partition $a$, the rollers journaled in said cage, the collar $g$, the dust-ring $i$, fitted against the inner end of the box and around the collar $g$, the washer $k$, bearing against the outer face of the partition $a$, the axle, and the nut secured on the axle and having the disk $m$ bearing against the outer end of the box and the washer, for the purpose set forth.

In testimony whereof I affix my signature in presence of two witnesses.

JAMES F. MORELL.

Witnesses:
FRANCIS D. PASTORIUS,
JOHN C. ROBERTS.